United States Patent [19]

Harvey et al.

[11] 4,176,389
[45] Nov. 27, 1979

[54] PHOTOFLASH UNIT WITH TWO-COLOR INDICATOR

[75] Inventors: William J. Harvey, Trout Run, Pa.; Thomas B. McDonough, San Jose, Calif.; John W. Shaffer, Williamsport, Pa.

[73] Assignee: GTE Sylvania Incorporated, Stamford, Conn.

[21] Appl. No.: 844,872

[22] Filed: Oct. 25, 1977

[51] Int. Cl.² .......................................... G03B 15/02
[52] U.S. Cl. .................................. 362/5; 362/11; 362/13; 362/16
[58] Field of Search ............... 362/5, 6, 11, 13, 16, 362/17, 241, 247, 346; 431/13, 359, 93, 95 R, 95 A; 354/126, 127, 132, 148

[56] References Cited

U.S. PATENT DOCUMENTS

| | | | |
|---|---|---|---|
| 3,718,815 | 2/1973 | McDonough | 362/6 |
| 3,894,226 | 7/1975 | Hanson | 362/5 |
| 3,956,625 | 5/1976 | Anderson | 362/13 |
| 4,048,487 | 9/1977 | Kewley | 362/13 |
| 4,093,979 | 6/1978 | Kewley et al. | 362/5 |
| 4,136,379 | 1/1979 | Chevali | 362/13 |

Primary Examiner—Benjamin R. Padgett
Assistant Examiner—J. L. Barr
Attorney, Agent, or Firm—Edward J. Coleman

[57] ABSTRACT

A photoflash unit having a flashed lamp indicator comprising two layers of film having different colors, one of the layers being a heat-shrinkable material and the other layer being translucent and substantially unaffected by the heat of lamp flashing. An adjacent indicia sheet provides an aperture through which one of the indicator colors is visible. Upon flashing of an associated lamp, the heat shrinkable layer shrivels from view and the color of the other layer becomes visible through the aperture to clearly identify which lamp was flashed. In one embodiment, the two-color indicator is used to identify the last lamp flashed in a sequence, while each of the preceding lamps in the sequence has a respectively associated single-layer color indicator which shrinks away to leave a void upon flashing of the lamp.

11 Claims, 8 Drawing Figures

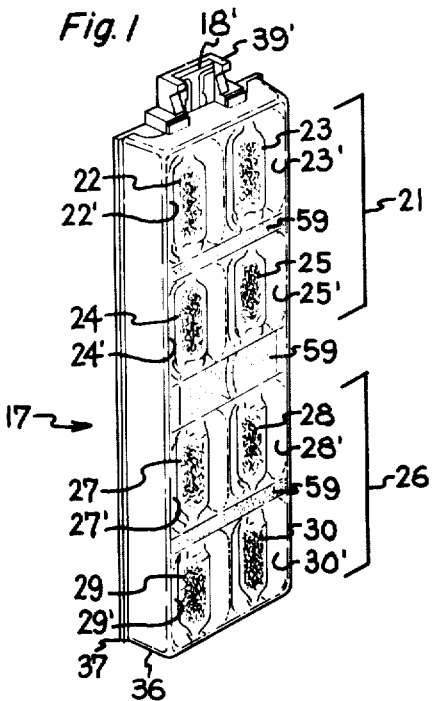
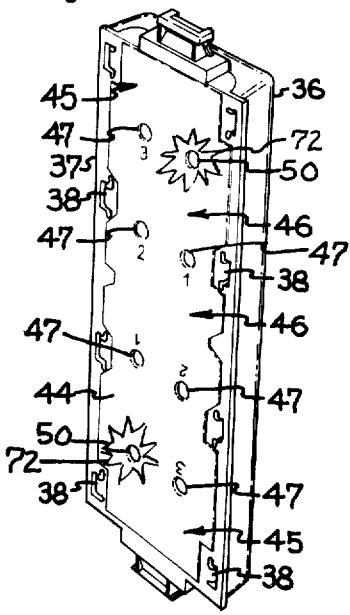
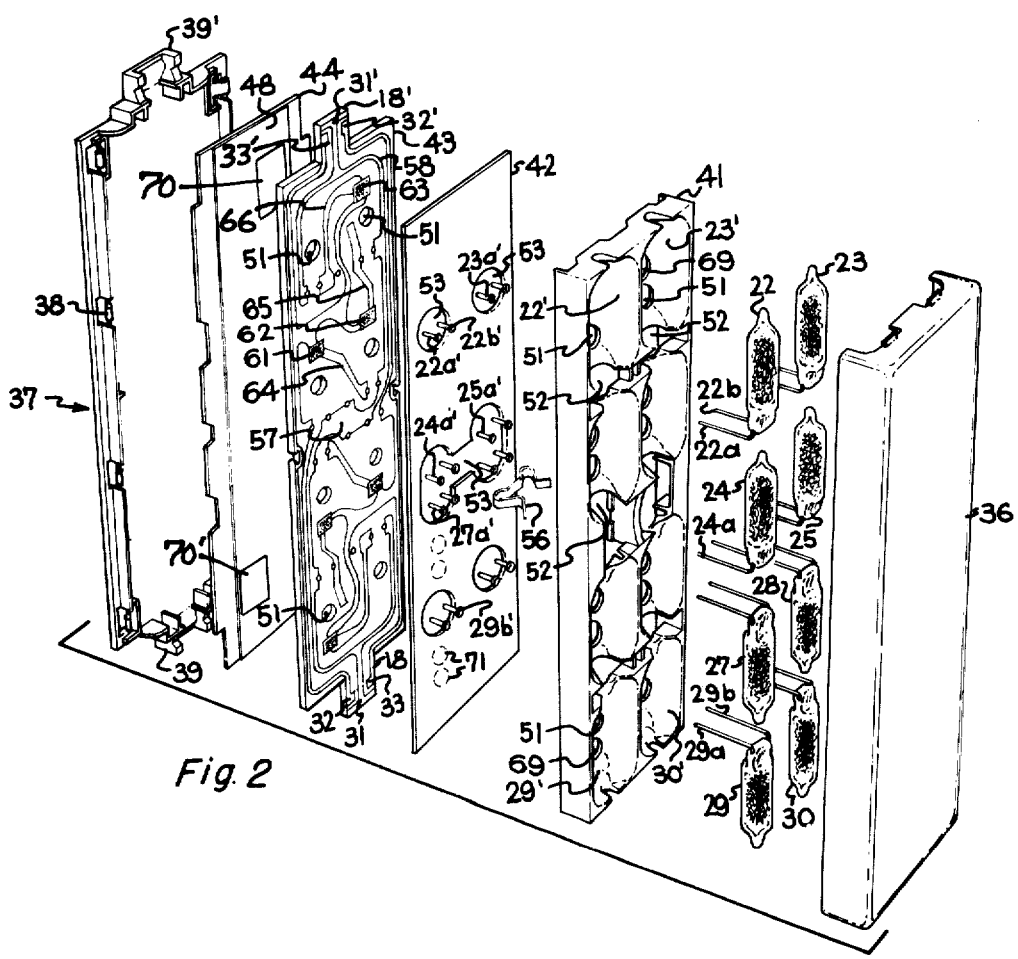

PHOTOFLASH UNIT WITH TWO-COLOR INDICATOR

BACKGROUND OF THE INVENTION

This invention relates to multilamp photoflash units and, more particularly, photographic flashlamp units having readily visible means for indicating a flashed lamp.

One type of previously known flashed lamp indicator is described in U.S. Pat. No. 3,718,815 (Mc Donough et al) as applied to a flash cube. This indicator is a two-color type comprising an insoluble pigment of the desired initial color, a quantity of powdered oil-soluble dye of the desired final color, and a powdered organic additive which melted and dissolved the dye upon flashing of the lamp associated therewith. The second color, e.g., red, thereby masked the initial color, e.g., light blue. The three powdered ingredients were applied from an aqueous slurry which included a small amount of water soluble binding agent. The spot or mark was applied by a transfer or printing process and required drying after application. Although quite useful, this prior indication method exhibited several weaknesses. For example, the spot could become discolored if the product was stored for a long period at high temperatures, such as in an automobile glove compartment during the summer. The printing and drying process is not sufficiently trouble-free to be readily incorporated into high-speed, automated equipment because the paste is affected by excessive working or shear-continuous milling action between a roller and platen which effects too intimate contact between the particles of dye and organic meltable solvent, thereby again causing discoloration. Further, the initial color must be muted so as to be overshadowed by the final color, in which the particles of initial pigment remain.

Another type of flash indicator that has been used commercially employs a heat-shrinkable thermoplastic polymer such as biaxially oriented polypropylene. For example, one type of commercially available flash unit that employs such an indicator comprises a bidirectional linear array of lamps and is referred to as a "flash bar". An indicia sheet insert is located within the flash unit container above the lamps. Heat-shrinkable colored plastic film comprising the indicator material is laminated to the under side of the indicia sheet, which has aperture aligned with each lamp to expose the brightly colored indicator film. The lamps of the flash unit are assembled in reflectors which have respective openings for providing thermal access paths to the respective aperture-exposed areas of indicator material. Upon flashing of a lamp, the heat radiated therefrom causes the colored (e.g. blue) plastic film to shrink away and disappear from the respective indicia sheet aperture to leave a void, or dark spot, identifying the lamp as having been flashed. A variation of this indicating method, wherein the flash indicator aperture are located along the side walls of the flash bar, is described in U.S. Pat. No. 3,956,625 (Anderson). Application of this approach to an indicia sheet on the back of a planar array of lamps that is commercially available and referred to as a "flip flash" is described in U.S. Pat. No. 3,894,226 (Hanson).

The heat-shrinkable film indicators provide significant advantages over the previously mentioned dye-change indicator. For example, since the functioning temperature of the film is relatively high, it exhibits the ability to tolerate elevated temperature storage without partially changing color. Further, the plastic film indicator is readily adaptable to high speed automated equipment. Nevertheless, this single-color, disappearing film approach does have some drawbacks. For example, under conditions of poor ambient lighting, the open areas would appear black, and ambiguous user interpretations could result. Further, in multiple lamp array type flash units, such as the flash bar and flip flash, where a series of lamps in one section of the array are to be flashed in sequence, and then the unit is turned around or flipped over to activate a new section of lamps, there is no uniquely striking indication when all of the lamps in sequence have been flashed. The only indication is a plurality of void areas for the respective flash indicator apertures of this sequence. It is not an uncommon experience to users of flash bar and flip flash units to forget to reposition the flash unit when all the lamps in the sequence are used, thereby leading to wasted film.

SUMMARY OF THE INVENTION

In view of the foregoing, it is an object of the present invention to provide a photoflash unit having an improved visual indicator to show which of the lamps have been flashed.

Another object is to provide a flashed lamp indicator having improved appearance both before and after functioning and which reliably changes color to show, under poor light conditions, which lamps have been used.

A further object is to provide an improved method for indicating when all the lamps in a sequence have been flashed.

These and other objects, advantages, and features are attained in accordance with the invention, by providing a photoflash unit comprising a closed container having a plurality of sides, a plurality of flashlamps disposed in the container, and at least one flashed lamp indicator located adjacent to a side of the container in radiant-energy receiving relationship with one of the flashlamps. In accordance with the invention, the indicator comprises a first layer of film having a first color and composed of a heat-shrinkable material, and a second layer of film juxtaposed with the first layer of film and having a second color. The second film layer is translucent and composed of a non-shrinkable material which is substantially unaffected by the heat of lamp flashing. Accordingly, upon flashing of the lamp associated with the indicator, the radiant energy from the lamp causes the first layer of film to shrink away from an area of the second layer of film to thereby significantly change the visual appearance of the indicator identifying that lamp as having been flashed. Preferably the indicator is disposed within the container with the translucent, non-shrinkable layer facing one of the flashlamps and the heat shrinkable layer facing the adjacent side of the container, which is visibly transparent in at least the portion in alignment with the indicator. In this manner, the visual appearance of the indicator changes from the first color to the second color upon flashing of the associated lamp. Typically, the unit further includes an indicia sheet disposed between the indicator and respective side of the container, with the indicia sheet having an aperture in alignment with the area of the indicator from which the first layer of film shrinks away in response to radiant energy from a flashed lamp.

In a preferred embodiment, as applied to a planar array of lamps arranged to be flashed in sequence, an indicia sheet on the back of the container has a plurality of apertures therethrough each in alignment with a respective one of the lamps. The indicator comprising first and second layer of films, in accordance with the invention, is aligned with the indicia sheet aperture aligned with the last lamp to be flashed in sequence. Aligned with each of the remaining indicia sheet apertures are respective single-layer indicators having only the heat shrinkable film of the first color. In this manner, flashing of all but the last of the lamps in sequence causes the respective single-layer indicators to shrink away and leave void, dark-appearing apertures in the indicia sheet. Flashing of the last of the lamps in sequence, however, causes the indicator aligned therewith to change from the first color to the second color, as viewed through the respective indicia sheet aperture, thereby providing a distinctly different indication when the last lamp in the sequence has been flashed.

The two-layer indicator of the invention, therefore, provides a vivid color-change type of flashed lamp indicating spot for multilamp flash devices wherein the displayed colors before and after flashing of the lamp associated therewith are different, but which indicator construction is readily adapted to automated production techniques and has the ability to tolerate elevated temperature storage without changing color. Further, use of the two-layer film structure as a selective indicator, such as identifying the last lamp of a flashed sequence, conveniently provides an effective method for alerting the flash unit user that he should reorient his array or plug in a new flash unit, thereby avoiding underexposed pictures.

BRIEF DESCRIPTION OF THE DRAWING

This invention will be more fully described hereinafter in conjunction with the accompanying drawings, in which:

FIG. 1 is a perspective view of the front of a photoflash unit having a plurality of lamps arranged in a planar array;

FIG. 2 is an exploded view of the photoflash unit of FIG. 1 showing the internal parts including a flashed lamp indicator arrangement in accordance with the invention;

FIG. 3 is a perspective view of the back of the photoflash unit of FIG. 1 from which the flash indicator arrangement according to the invention is visible to the user;

DESCRIPTION OF PREFERRED EMBODIMENT

Figure 6:
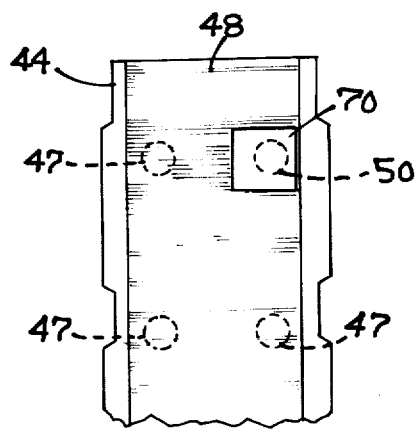
FIG. 6 is a fragmentary view of the top half of the indicia sheet lamination used in the assembly of FIG. 2 as seen from the indicator sheet side.

The concepts of the present invention are particularly useful as embodied in a multilamp photoflash array similar to the type described in U.S. Pat. No. 3,894,226 and referred to as a flip flash. As illustrated in FIGS. 1 and 2, this multilamp unit is of the planar type which contains a plurality of electrically fired flashlamps and is provided with a plug-in connector tab 18 at the lower side or end thereof, adapted to fit into a socket of a camera or flash adapter. The array is provided with a second plug-in connector tab 18' at the top side or end thereof, whereby the array unit is adapted to be attached to the camera socket in either of two orientations, i.e., with either the tab 18 or tab 18' plugged into the socket. The array is provided with an upper group 21 of flashlamps 22, 23, 24 and 25, and a lower group 26 of flashlamps 27, 28, 29 and 30, the lamps being arranged in a planar configuration. Reflectors 22', etc., are disposed behind their respective flashlamps so that as each lamp is flashed, its light is projected forwardly of the array. The lamps are arranged and connected so that when the array is connected to a camera by the connector 18, only the upper group 21 of lamps will be flashed, and when the array is turned end for end and connected to the camera by the other connector 18', only the then upper group 26 of lamps will be flashed. By this arrangement, only lamps relatively far from the camera lens axis are flashable, thus reducing the undesirable red-eye effect.

The construction of the array comprises front and back housing members 36 and 37 which preferably are made of plastic and are provided with interlocking members 38 which can be molded integrally with the housing members and which lock the housing members together in final assembly to form a closed container for the flash array structure. In the preferred embodiment shown, the front housing member 36 is a rectangular cavity and the back housing member 37 is a substantially flat container side wall and includes integral extensions 39 and 39' at the ends thereof which partly surround and protect the connect tabs 18 and 18' and also function to facilitate mechanical attachment to the camera socket. Sandwiched between the front and back housing members 36 and 37, in the order named, are the flash lamps 22, etc., an electrically conductive unitary reflector member 41 (preferably of aluminum-coated plastic) shaped to provide the individual reflectors 22', etc., an electrically insulating sheet 42, a printed circuit board 43 provided with integral connector tabs 18 and 18', and an indicia sheet 44 which may be provided with information and trademarks, and other indicia such as flash indicators 47 and 50 (see FIG. 3) located behind the respective lamps and which change color due to heat and/or light radiation from a flashing lamp, thus indicating which of the lamps have been flashed and not flashed. As will be described hereinafter, reflector unit 41 has an array of openings 51 and 69 to provide access channels for the radiant energy emitted during lamp flashing. To facilitate transfer of this radiation to the circuit board and indicator sheet, insulating sheet 42 is typically of a transparent plastic material. This radiation transfer may be improved, however, by providing small openings 71, indicated by dashed lines in FIG. 2, through the sheet 42 in alignment with the reflector openings 51 and 69.

The indicia sheet 44 may be of a paper or thin cardboard and provided with openings (see FIG. 3) where the flash indicators 47 and 50 are desired. The flash indicators 47 are of the single-layer prior art type comprising a sheet-like heat sensitive plastic material, for example biaxially oriented polypropylene, which shrinks or melts when subjected to heat or radiant energy from an adjacent flashing lamp, thus effectively changing the color of the openings in the indicia sheet 4. For example, if the initial color of the indicator sheet is blue, flashing the associated lamp will cause the single film of blue to shrink away from the indicia sheet aperture and leave a void, dark-appearing area. A single flash indicator sheet 48 may be laminated to the indicia sheet and arranged over all of the flash indicator openings. Openings 51 are provided through the reflector unit 41 and the circuit board 43 to facilitate radiation from the flashing lamp reaching the respective flash indicator areas. The rear housing, or container side wall, member 37 is transparent (either of clear material or provided with window openings) to permit viewing of the indicia on the indicia sheet 44. The front housing member 36 is transparent at least in front of the lamps 22 etc., to permit light from the flashing lamps to emerge forwardly of the array, and may be tinted to alter the color of the light from the flashlamps.

The height and width of the rectangular array are substantially greater than its thickness, and the height and width of the reflector member 41, insulating sheet 42 and circuit board 43 are substantially the same as the interior height and width of the housing member 36 to facilitate holding the parts in place.

The tab 18, which is integral with the circuit board 43, is provided with a pair of electrical terminals 31 and 32, and similarly the tab 18' is provided with a pair of terminals 31' and 32' for contacting terminals of a camera socket for applying firing voltage pulses to the array. Each tab is provided with a third terminal 33 and 33', respectively, which functions to electrically short the circuitry of the inactive lower groups of lamps when the array is plugged into a socket. The terminals 31 and 31' are shown as having a lateral "T-bar" configuration for temporarily shorting the socket terminals while the array is being plugged in, to discharge any residual voltage charge on the firing pulse and also to reduce the likelihood of lamps being accidentally flashed by an electrostatic voltage when the array is handled.

The circuit board 43 has a printed circuit thereon for causing the sequential flashing of the lamps by firing voltage pulses applied to the terminals 31, 32 and 31', 32'. The top and bottom halves of the printed circuitry preferably are reversed mirror images of each other. The lead-in wires 22a, 22b, etc. of the lamps 22 etc. may be attached to the circuit board 43 in various ways such as by means of metal eyelets 22a', 22b', etc. secured respectively in holes through the circuit board. The lead-in wires 22a, 22b, etc. pass through openings 52 in the reflector member 41 and through openings 53 in the insulating sheet 42 and into or through the respective pairs of eyelets 22a' and 22b', etc. and the ends of the eyelets are crimped to hold the lead-in wires and make electrical contact thereto. The heads of the eyelets are rolled over in electrical contact with the circuit of the circuit board. A metal clip 56 is clipped onto the reflector member 41, which reflector is preferably made of metal-coated plastic, and the rear of the clip 56 rests in touching contact against an area 57 of an electrical ground circuit comprising a continuous conductor run 58 on the circuit board and which includes, or is connected to, the terminals 31 and 31' and which is connected in common and makes contact with one of the pairs of connector eyelets for each of the lamps 22, etc., whereby the reflector unit 41 additionally functions as an electrically grounded shield.

Areas 59 on the transparent front housing member 36 may be made opaque or partly opaque, such as by making the surface roughened at these areas, to fully or partially conceal the lamp lead-in wires 22a, 22b, etc., and/or the lower portions of the lamps, for improved appearance of the array.

The circuit board terminal 32 is part of a conductor run that is electrically connected to lead-in wires 24a of lamp 24 at the eyelet 24a' and terminates at radiation switches 61, 62 and 63 respectively positioned near lamps 24, 25 and 23. A circuit board conductor run 64 is connected electrically to the remaining lead-in wire of flashlamp at eyelet 25a' and terminates at the radiation switch 61. A circuit board conductor run 65 is connected to the remaining lead-in wire of flashlamp 23 at eyelet 23a' and terminates at the radiation switch 62. Similarly, a circuit board conductor run 66 is connected to the remaining lead-in wire of flashlamp 22 at eyelet 22b' and terminates at radiation switch 63.

The radiation switches 61, 62 and 63 respectively are in contact with and bridge across the circuit runs that are connected to them. The material for the radiation switch may be suitable material initially having an open circuit or high resistance, the resistance thereof becoming zero or of a low value when the material receives radiation in the form of heat and/or light from a respective adjacent lamp upon the lamp being flashed. For this purpose, each of the radiation switches is respectively positioned behind and near to a flashlamp 24, 25, and 23. Windows in the form of transparent sections or openings 69 may be provided in the reflectors in front of the switches as shown in FIG. 2 to facilitate radiation transfer. A suitable material for the radiation switches is silver oxide dispersed in a binder such as polyvinyl resin. Each of these radiation switches upon receiving heat and/or light radiation from the adjacent lamp when it is flashed, changes from an open circuit or high resistance to a closed circuit or a low resistance between its switch terminals on the circuit board.

As has been explained, the lower portion of the circuit board contains a substantially reverse mirror image of the same circuit shown on the upper portion of the circuit board and, therefore, will not be described in detail. It will be noted that the circuit runs from the plugged-in terminals 31 and 32 at the lower part of the circuit board extend upwardly so as to activate the circuitry in the upper half of the circuit board. Similarly, when the circuit board is turned around and tab 18' is plugged into a socket, the circuit board terminals 31' and 32' will be connected to and activate the lamps which will then be in the upper half of the circuit board, and hence in the upper half of the flash unit. This accomplishes, as has been stated, the desirable characteristics whereby only the group of lamps relatively farthest away from the camera lens axis will be flashed, thereby reducing or eliminating the undesirable red-eye effect.

The circuit on the circuit board 43 of FIG. 2 functions as follows. Assuming that none of the four lamps in the upper half of the unit have been flashed, upon occurrence of a first firing pulsed applied upon ther terminals 31, 32, this pulse will be directly applied to lead-in wires of the first connected flash lamp 24, whereupon the lamp 24 flashes and becomes an open circuit between its lead-in wires. Heat and/or light radiation from the flashing of the first lamp 24 causes the adjacent radiation switch 61 to become a closed circuit (or a low value of resistance), thereby connecting the circuit board terminal 32 electrically to the lead-in wire of the second lamp 25 at eyelet 25a'. By the time this occurs, the firing pulse has diminished to a value insufficient to cause the second lamp 25 to flash. When the next firing pulse occurs, it is applied to the lead-in wires of the second lamp 25 via the now closed radiation switch 61, whereupon the second lamp 25 flashes, thereby causing radiation switch 62 to assume zero or low resistance, and the second lamp 25 now has an open circuit for high resistance between its lead-in wires. When the next firing pulse occurs, it is applied via now closed radiation switch 62 to the third lamp 23, thereby firing the lamp which becomes an open circuit, and the radiation from it causes the radiation switch 63 to become essentially a closed circuit across its terminals. Thus, the next firing pulse will be applied via now closed radiation switch 63 to the lead-in wires of the fourth flashlamp 22, thereupon causing the to flash. Since lamp 22 is the last lamp flashed in sequence in the active circuit, it does not matter whether its lead-in wires are an opened or closed circuit after flashing. Additional flashlamps, radiation switches and electrical conductors can be employed, if desired, using the just described principles. When the flash unit is turned around and the other connector tab 20' attached to the camera socket, the group of lamps that has become uppermost and relatively farthest away from the lens axis will be an active circuit and will be flashed in sequence in the same manner as has been described.

In order to assist the user of the flash unit in knowing which lamps have been flashed, the back of the flash unit (which faces the user in normal operation) has an indicia sheet including number flash indicators 47, as mentioned hereinbefore. Accordingly, when the first lamp 24 of the sequence flashes, the flash indicator 47 opening above the numeral "1" on the indicia sheet (FIG. 3) changes from a given color, say, blue, to a void, or dark-appearing, space as a result of the single-film layer of colored heat shrinkable material melting and shrinking back away from the center of the indicia sheet opening in response to radiation emitted from the flashed lamp 24 and transmitted via the corresponding reflector and circuit board apertures 51 and the transparent sheet 42, or an aperture 71 therein. In like manner, upon the flashing of the second lamp 25, the colored layer of film covering the indicator opening above the numeral "2" on the indicia sheet is caused to shrink away. When the third lamp in the sequence, lamp 23, is flashed, the colored film covering the opening above the numeral "3" the indicia sheet is caused to shrink away and thereby provide a color change indication in the same manner as for the flashing of the first and second lamps in the sequence. In the prior art, the fourth and last lamp to be flashed employed a similar color change indication, but this has proven to be insufficient indication according to user experience. As a result, the user goes on to attempt to take a fifth and perhaps sixth picture with his camera, only to find that there is no flash because he has neglected to remove the flash unit after the fourth (and last) lamp of the upper sequence has been expended and either turn the unit around to plug in the other end or employ a new flash unit. This, of course, results in a waste of film and photographic subject opportunities due to underexposure.

Figure 4:
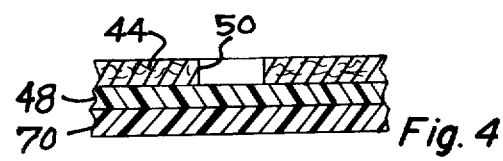
FIG. 4 is a sectional diagram illustrating a two-layer indicator laminated to an indicia sheet according to the invention.

In accordance with the present invention, a unique two-layer indicator is provided which is particularly useful as a "last-lamp indicator" since it provides a sharp clear change from a first distinct color to a second distinct color upon flashing of an adjacent lamp. Referring to FIG. 4, the new flash indicator according to the present invention comprises a first layer of film 48 having a first color, such as blue, on at least one side and composed of a heat-shrinkable material. A second layer of film 70 is juxtaposed with the first layer of film and has a second color, say red, on at least one side. The second layer of film 70 is translucent and composed of a non-shrinkable material which is substantially unaffected by the heat of lamp flashing. Referring now also to FIGS. 2 and 6, this unique two-layer indicator can be readily provided in the above-described planar flash-lamp unit by employing as the first film layer, the heat shrinkable plastic sheet 48 which is laminated to the back of the paper indicia sheet 44 for providing the indicators 47 which are aligned with the first three lamps to be flashed in the sequence. The second layer 70 is then provided by securing a patch of the non-shrinkable material, such as by adhesive, to the back of the sheet 48 in alignment with indicia sheet aperture 50 corresponding to the last lamp to be fired in the sequence, i.e. lamp 22. A similar patch 70' is located at the other end of the laminated indicia sheet in alignment with the aperture 50 corresponding to lamp 29 (the last to be fired in the sequence at the other end of the unit).

The layer of heat shrinkable film 48 is relatively thin, e.g. less than 0.001", and opaque and is preferably composed of a mono- or biaxially oriented material such as polystyrene, polyethylene, polypropylene, polyester, or nylon. The side of the film 48 facing the indicia sheet and aperture 50 is the desired indicator color, such as blue, while the opposite side of the film 48 which faces the lamps preferably is blackened to facilitate absorption of the radiant output of the lamps.

The second film layer 70, on the other hand, should be a clear or translucent non-shrinkable material, such as cellophane cellulose acetate, or polyester which facilitates transmission of the radiation from a flashed lamp to activate shrinking away of the first layer 48. Preferably, the indicator color for the second layer 70, such as red, is on the side juxtaposed with the first layer 48, while the opposite side of layer 70 is whitened to facilitate a bright visual appearance of the second color.

Figure 5:
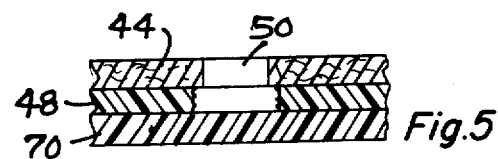
FIG. 5 is a sectional diagram of the indicator arrangement of FIG. 4 showing an area of one of the layers shrunk away as would result from the application of radiant energy.

In operation, prior to lamp flashing, the indicator aperture 50 in the indicia sheet 44 exhibits a desired initial color, e.g., blue. Upon flashing of the lamp 22, the portion of the film 48 covering the aperture 50 shrinks back beneath the solid area of the indicia sheet 44, as shown in FIG. 5, so as to expose the distinctly different-colored underlying side of film 70. The change in color is quite obvious and shows that the last lamp has been used. To further enhance "last-lamp indication" in accordance with the invention, the indicia sheet can have a distinctive eye-attracting marking about the aperture 50, such as a yellow sunburst 72 as shown in FIG. 3. Hence, when a person uses a flash unit having a "last-lamp indicator" in accordance with a preferred embodiment of the invention, he or she will see a change from a bright blue to a void at the first, second and third indicator apertures, but he or she will be sharply alerted to the flashing of the last lamp in the sequence by a distinct change in the color spot 50 from a bright blue to a bright red at the center of a yellow sunburst marking 72.

Although the preferred embodiment of the invention has been described with respect to using the unique two-layer indicator as a "last-lamp indicator", it will be appreciated that this two-layer scheme can be employed for all of the indicators, and for a variety of different types of multilamp flash units, to provide a more positive color change indication for each lamp of a sequence. For example, in an alternative embodiment of the above-described planar array, the sheet of non-shrinkable material may be the same size as that of the shrinkable layer 48 and laminated to the darkened side thereof. As a further alternative, a section of, say, yellow-colored non-shrinkable material may be disposed behind the shrinkable layer in alignment with all of the indicator apertures except for the last-lamp apertures 50, with a section of, say, red-colored non-shrinkable material disposed in alignment with the apertures 50 in order to retain the distinctive color indication for the last flashed lamp in the sequence.

In the case of the bi-directional linear arrays of lamps referred to as flash bar units, the indicia sheet with indicator apertures can be located at the top of the array of lamps, and the shrinkable and non-shrinkable layers of color film can be laminated to the underside of the indicia sheet. In such an arrangement, openings should be provided in the reflector unit above each lamp so as to provide an access channel for radiation from a flashed lamp to reach the two-layers of indicator material. A similar arrangement could be used for providing the two-layer flash indicators on the top portion of a flash cube unit.

A modification of the above-described two-color scheme is to use the same color for the indicia sheet 44 and the shrinkable film layer 48 so that the indicators show up in the color of the non-shrinkable layer 70 after the respective lamp is flashed. This eliminates the need for a user to remember which color represents a used lamp. For example, with a black indicia sheet 44 and a black shrinkable film 48, the effect can be dramatic when film 70 is a bright or fluorescent red.

The color of the indicator before functioning is limited. Film 48 may be black, white, or any color chosen. If film 48 is to be white or a light color, however, its underside (as viewed in FIG. 4) must be black or dark-colored so as to facilitate its radiant energy absorption. This is to assure that the film substrate gets hot enough to function properly when a lamp is flashed. Functioning can be enhanced by slitting film 48 centrally within the aperture 50 in indicia sheet 44. The final color of the indicator after functioning is more limited. It may not be black or very dark in color because film 70 must be relatively transparent to the lamp radiation, particularly in the near-infrared region of the spectrum, e.g., from a wavelength of about 0.8 to about 1.5 micrometers. To attain the desired visual translucency in film 70 without interfering with the shrinkage of film 48, film 70 may have rough or irregular surfaces. These surfaces on film 70 may be created by, for example, sand blasting the film surfaces with glass microspheres, by chemically induced crazing, or by crazing or whitening of the film 70 by mechanical stretching. The roughened film 70 appears white by reflected light. It may be colored, if desired, by dyeing or may be pigmented with organic pigments of high transmittance in the near infrared regions. Colors, such as red, orange, or yellow are preferred if pigments are to be used. Translucent dyed film of some other colors (e.g. blue, green or violet) should not be dark in color. It should be noted that dark colors would be generally undesirable in any event because of poor visibility under low ambient light. An exception would, of course, be if the initial spot color where white or a light color such as yellow.

Figure 7:
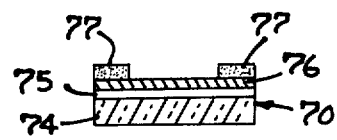
FIG. 7 is an enlarged sectional schematic of an indicator tape suitable for use as the translucent, non-shrinkable layer of the indicator according to the invention.
Figure 8:
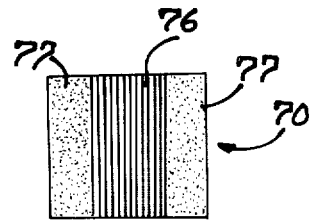
FIG. 8 is a view of a segment of the tape of FIG. 7 as seen from the indicator color side.

According to a preferred embodiment of the invention, the patch 70 of the non-shrinkable layer of film comprises a segment of tape (see FIGS. 7 and 8) consisting of a clear cellophane substrate 74, a white coating 75 on one side of the cellophane substrate, a coating 76 of the desired after-flash indicator color over the white coating 75, and a coating of pressure-sensitive adhesive 77 over selected areas of the coating 76. More specifically, the adhesive coating 76 is in the form of narrow strips along the two opposing edges of the tape, with the area of the color coating 76 therebetween being uncoated with adhesive and being in alignment with the respective aperture 50 in the indicia sheet 44. In one particular embodiment, the cellophane tape 74 had a width of about 0.5", the width of each adhesive strip was between about 1/16 and ⅛ of an inch, and the spacing between the adhesive strips was about ¼ inch. The thickness of the cellophane tape was about 1.4 mils, uncoated, and the thickness of the adhesive was about 0.9 mils.

The advantages of the two-layer indicator according to the invention include: the ability to tolerate elevated temperature storage without partially changing color; compatability of this indicator construction with automated production techniques; the ability to provide initial and final colors of much greater variety and intensity when compared with previously known two-color indicators; and a much more vivid color signal than would be attained by mere disappearance of a colored shrinkable film with no secondary covering over the indicia sheet apertures.

An alternative method of construction comprises the placement of the translucent non-shrinkable film between the paper indicia sheet and the opaque shrinkable film. That is, in FIG. 4 layers 70 and 48 would be reversed. In this case, the white or light colored translucent film transmits sufficiently the dark (e.g. black) or intense color of the shrinkable film so as to noticeably change in appearance when the underlying film is pulled out of view by radiation activated shrinking.

Hence although the invention has been described with respect to specific embodiments, it will be appreciated that modifications and changes may be made by those skilled in the art without departing from the true spirit and scope of the invention. For example, the non-shrinkable translucent layer 70 could be made from a fabric or even paper. All that is required is that it remain unaffected by the heat of lamp flashing and that it transmit sufficient radiant energy to permit proper functioning of the indicator. The shrinkable film need not be highly oriented, but must merely shrink or melt readily upon heating. For example, unoriented Saran polyvinyliodine chloride is quite sensitive. Certain woven or non-woven fabrics, for example nylon, shrink quite readily and could conceivably be used. Further, the indicator layers could be disposed on the exterior of the flash unit container, and the photoflash unit does not necessarily have to employ an indicia sheet.

What we claim is:

1. A photoflash unit comprising: a closed container having a plurality of sides; a plurality of flashlamps disposed in said container; and at least one flashed lamp indicator located adjacent to a side of said container in radiant-energy-receiving relationship with one of said flashlamps, said indicator comprising, a first layer of film having a first color and composed of a heat-shrinkable material, and a second layer of film juxtaposed with said first layer of film and having a second color, said second layer of film being translucent and composed of a non-shrinkable material which is substantially unaffected by the heat of lamp flashing; whereby upon the flashing of said one of said lamps, the radiant energy therefrom causes said first layer of film to shrink away from an area of said second layer of film to thereby significantly change the visual appearance of said indicator for identifying said one lamp as having been flashed.

2. The photoflash unit of claim 1 wherein said indicator is disposed within said container, said second layer of film is disposed on the side of said indicator facing said one of said flashlamps and is substantially transparent to flashed lamp radiation in the wavelength spectrum of from about 0.8 to about 1.5 micrometers, said first layer of film is disposed on the side of said indicator facing the respectively adjacent side of said container, and said respective side of the container is visibly transparent in at least the portion thereof in alignment with said indicator, and whereby the visual appearance of said indicator changes from said first color to said second color upon the flashing of said one lamp.

3. The photoflash unit of claim 2 further including an indicia sheet disposed between said indicator and said respective side of said container, said indicia sheet having an aperture therethrough in alignment with said area of said indicator from which said first layer of film shrinks away in response to radiant energy from a flashed lamp.

4. The photoflash unit of claim 3 wherein the general color of said indicia sheet is said first color, whereby said indicator is substantially unnoticeable prior to lamp flashing and is visible as said second color after flashing of the respective lamp.

5. The photoflash unit of claim 3 wherein said indicia sheet has a plurality of apertures therethrough each in alignment with a respective one of said flashlamps, said respective side of the container is visibly transparent in at least the portions thereof in alignment with said apertures, said plurality of lamps are arranged for flashing in sequence, and said indicator comprising said first and second layers of film is aligned with the indicia sheet aperture aligned with the last lamp to be flashed in sequence, and further including single-layer flashed lamp indicators respectively aligned with the remaining indicia sheet apertures, each of said single-layer indicators comprising said first layer of film and having no second layer of film, whereby flashing of all but the last of said lamps in sequence causes the respective single-layer indicators to shrink away and leave void, dark-appearing apertures in said indicia sheet, and flashing of the last of said lamps in sequence causes the indicator aligned therewih to change from said first color to said second color, as viewed through the respective indicia sheet aperture, thereby providing a distinctly different indication when the last lamp in the sequence has been flashed.

6. The photoflash unit of claim 5 wherein said indicia sheet has a distinctive eye-attracting marking about the aperture therethrough which is aligned with the last lamp to be flashed in sequence.

7. The photoflash unit of claim 5 wherein said first layer of film of each of said single-layer indicators and of said indicator aligned with the last lamp to be flashed in sequence comprises a single sheet of heat-shrinkable material which is laminated to said indicia sheet and blackened on the side facing said lamps, and said second layer of film comprises a patch of material which is adhesively attached to the blackened side of said first layer of film and whitened on the side facing said last lamp to be flashed in sequence.

8. The photoflash unit of claim 7 wherein said heat-shrinkable material of said first layer of film comprises mono- or biaxially oriented polystyrene, polyethylene, polypropylene, polyester or nylon, and said nonshrinkable material of said second layer of film comprises cellophane, cellulose acetate, polyester, a fabric or paper.

9. The photoflash unit of claim 7 wherein said patch of said second layer of film comprises a segment of tape consisting of a clear cellophane substrate, a white coating on one side of said cellophane substrate, a coating of said second color over said white coating, and a coating of pressure-sensitive adhesive over selected areas of said coating of the second color, said adhesive coating being in the form of narrow strips along two opposing edges of said tape, with the area of said second color coating therebetween being uncoated with adhesive and being in alignment with the respective aperture in said indicia sheet.

10. The photoflash unit of claim 5 wherein said flashlamps are arranged in a planar array and further including, a printed circuit board having circuitry on a surface thereof, said plurality of flashlamps being positioned over said surface and having lead-in wires connected to said circuitry, said circuitry being provided for sequentially igniting said flashlamps, and a plurality of reflectors respectively associated with said flashlamps and positioned between said lamps and said circuit board, each of said reflectors having an aperture therein, said circuit board having a plurality of apertures in alignment respectively with the apertures of said reflectors, all of said indicators being disposed between said circuit board and said indicia sheet, and each aligned set of said reflector and circuit board apertures being in alignment with a respective aperture of said indicia sheet.

11. The photoflash unit of claim 3 further including a plurality of reflectors respectively associated with said flashlamps and each having surfaces disposed between its associated lamp and all but one of the sides of said container, the reflector associated with said one of said lamps having an opening in alignment with said indicia sheet aperture, and said indicator being disposed between said last-mentioned reflector and said indicia sheet, said reflector opening providing a radiant energy access channel between the associated flashlamp and said indicator when the lamp is flashed.

* * * * *